Nov. 21, 1933.  E. J. KEARNEY  1,935,847
MACHINE TOOL ORGANIZATION
Filed Feb. 17, 1928
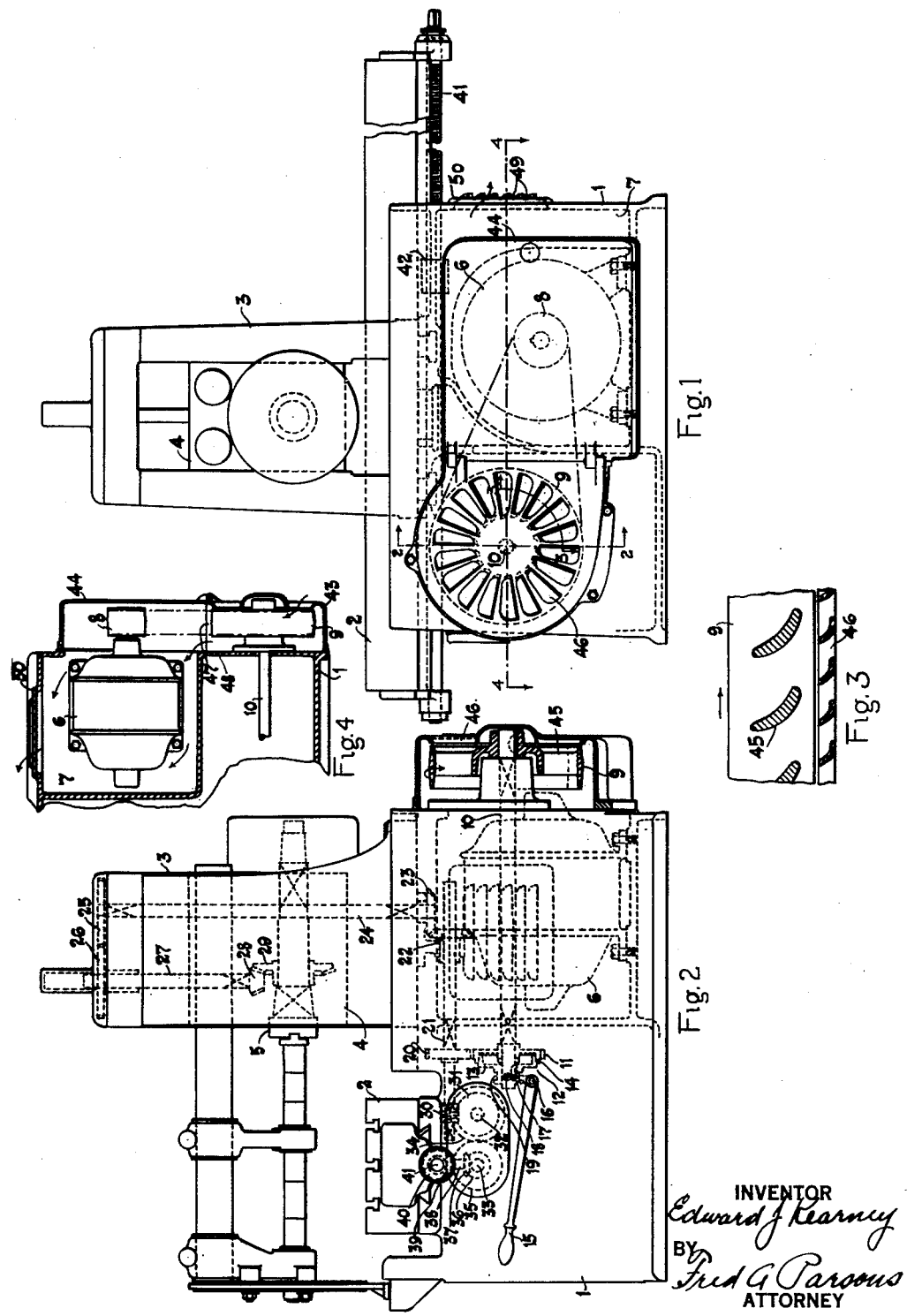
INVENTOR
Edward J Kearney
BY
Fred G Parsons
ATTORNEY Patented Nov. 21, 1933

1,935,847

UNITED STATES PATENT OFFICE 1,935,847

MACHINE TOOL ORGANIZATION

Edward J. Kearney, Wauwatosa, Wis., assignor to Kearney & Trecker Corporation, West Allis, Wis.

Application February 17, 1928. Serial No. 254,957

2 Claims. (Cl. 90—11)

This invention relates to machine tools and particularly to improved driving means therefor.

Machine tools are frequently driven by individual electric motors, and sometimes such motors are housed in the machine tool structure. A limiting feature of such construction has been that the heat generated by the motor and transmission combined causes the final temperature to rise too high, resulting in inaccuracy due to expansion of the structure members, or damage to bearings and motor insulation.

It is a purpose of this invention to provide improved means for removing heat from the motor and structure of such a combination.

A further purpose is generally to simplify and improve the construction and operation of machine tool driving and cooling devices and the combination thereof with the machine tool structure, and still other purposes will be apparent from this specification.

In the accompanying drawing the same reference characters have been used for the same parts throughout.

Fig. 1 is a rear elevation of a milling machine in which the invention is incorporated.

Fig. 2 is a left side elevation of the same machine.

Fig. 3 is an enlarged partial sectional development through a fan pulley and cover along line 3—3 of Fig. 1.

Fig. 4 is a partial horizontal section along line 4—4 of Fig. 1.

The machine structure includes a stationary base or housing 1, a table 2 slidably horizontally guided thereon, an upstanding head or column 3 slidably guided on the bed for horizontal movement transverse to the table movement, and a carrier 4 slidably guided in head 3 for vertical movement.

Carrier 4 supports a rotatable spindle 5, and table 2 and spindle 5 have transmission mechanism originating in a motor 6 removably housed in a substantially closed chamber 7 in the bed. The spindle train is as follows. A pulley 8 fixed on the motor shaft drives a pulley 9 fixed on a shaft 10 by any suitable means such as a belt or chain. Rotatable on shaft 10 is a gear 11 which may be clutched with the shaft by the means of a clutch generally denoted by the numeral 12, clutch 12 may be of any suitable form but here consists of a member 13 slidably keyed on shaft 11 and having a friction face 14 engageable with a complementary friction surface on gear 11. Member 13 may be moved to engage or disengage the friction faces by the means of a hand lever 15 fixed on a shaft 16 upon which is also fixed a lever 17 having a pivoted shoe 18 engaging an annular groove 19 in the hub of member 13. If the clutch is engaged, gear 11 is driven and drives a gear 20 fixed on a shaft 21 which then drives the spindle through bevel gears 22—23, shaft 24, spur gears 25—26 a shaft 27 slidably splined with gear 26, and bevel gears 28—29, the last mentioned gear being fixed on the spindle.

The table derives motion through a portion of the train just described, being driven from shaft 21, whereby clutch 12 is simultaneously operative both on the table and spindle. The remainder of the table train is as follows. Fixed on shaft 21 is a worm 30 engaging worm wheel 31 fixed on a shaft 32 which drives a shaft 33 through gears 34—35. Shaft 33 drives the table through meshed bevel gears 36—37, shaft 38 and bevel gears 39—40, the last mentioned gear being slidably splined on a table screw 41 rotatably journaled for axial movement with the table and threadedly engaging a nut 42 (Fig. 1) fixed with the bed.

The pulley 9 is provided with a cover or housing 43 fixed on the bed and hingedly supporting a rear cover 44 of the motor chamber 7, the hinged cover providing easy access to the motor 6 for inspection or removal for repairs. The pulley 9 has arms 45 (Figs. 2 and 3) formed to act as fans as the pulley rotates whereby air is drawn through openings or louvers 46 in the cover 48 and passes into the motor chamber through a passageway 47 (Fig. 4) formed between the wall 48 and the walls of covers 43 and 44 when the covers are in normal position. Such air passes around the motor, cooling it and the walls of the chamber 7 and is expelled from openings or louvers 49 (Fig. 1) in a plate 50, which covers an opening into the motor chamber.

The pulley 9 runs at less than motor shaft speed but is of relatively large fan diameter, and provides sufficient air flow to maintain the motor at safe temperatures under the most severe conditions of loading. The air enters the motor chamber at room temperature and leaves at a relatively high temperature, but the openings 49 through which the relatively high temperature air leaves the motor chamber are relatively remote from any of the transmission mechanism and from structure walls which if raised in temperature might affect the accuracy of the machine, or transmit an unsafe degree of heat to the transmission members thereof.

What is claimed is:

1. In a milling machine the combination of a base providing a substantially closed chamber in part formed by wall portions of said base, a tool spindle rotatably supported from said base, a table supported from said base for reciprocatory movement in a path transverse to the axis of said spindle, an electric motor housed within said chamber, a fan supported from said base, said base providing a passage through which said fan is adapted to circulate air and including said chamber, and transmission mechanism including power trains connecting both said spindle and table to be driven from said motor, clutch means for simultaneously interrupting both said trains, and a power train connecting said fan to be actuated from said motor exclusive of said clutch means.

2. In a milling machine, the combination of a base, providing a substantially closed chamber in part formed by wall portions of said base, a tool spindle rotatably supported from said base, a table supported from said base for reciprocatory movement in a path transverse to the axis of said spindle, an electric motor housed within said chamber, a transmission for driving said spindle from said motor and including motion interrupting means, air impelling means driven from said motor exclusive of said motion interrupting means, and a passage disposed to direct air impelled by said means into cooling relation with the interior walls of said chamber.

EDWARD J. KEARNEY.